(12) United States Patent
Bickley

(10) Patent No.: US 7,178,335 B2
(45) Date of Patent: Feb. 20, 2007

(54) PRESSURE REGULATOR

(75) Inventor: Daniel James Bickley, Birmingham (GB)

(73) Assignee: Goodrich Control Systems Limited (GB)

( * ) Notice: Subject to any disclaimer, the term of this patent is extended or adjusted under 35 U.S.C. 154(b) by 26 days.

(21) Appl. No.: 11/167,642

(22) Filed: Jun. 27, 2005

(65) Prior Publication Data

US 2006/0218911 A1    Oct. 5, 2006

(30) Foreign Application Priority Data

Jul. 30, 2004    (GB) .................................... 0417034

(51) Int. Cl.
*F16K 31/12*    (2006.01)
*F02M 63/00*    (2006.01)

(52) U.S. Cl. ................................... 60/426; 137/505.15

(58) Field of Classification Search .................. 60/426; 137/505.13, 505.14, 505.15, 505.18, 505.21

See application file for complete search history.

(56) References Cited

U.S. PATENT DOCUMENTS 1,528,297 A * 3/1925 Jones .................... 137/505.26
1,602,209 A * 10/1926 Proell .......................... 137/494
3,576,193 A * 4/1971 Rothfuss et al. ........ 137/505.13
4,665,881 A * 5/1987 Wade .......................... 123/557
6,564,826 B2 * 5/2003 Shen ...................... 137/505.18

* cited by examiner

*Primary Examiner*—Thomas E. Lazo
(74) *Attorney, Agent, or Firm*—Andrus, Sceales, Starke & Sawall, LLP

(57) ABSTRACT

A pressure regulator includes a housing, a metering spool, a first pressure chamber at a reference pressure to which one end of the metering spool is exposed, a spring within the first pressure chamber acting against the one end of the metering spool, a second pressure chamber containing hydraulic fluid at the regulated pressure acting against the opposite end of the metering spool, wherein the position of the metering spool relative to the housing is a position of equilibrium that changes to maintain a predetermined pressure difference between the reference pressure and the regulated pressure. An abutment against which the opposite end of the spring reacts is provided and a third pressure chamber at a control pressure acts on the abutment, such that the control pressure can be changed to adjust the position of the abutment to change the pre-load of the spring to adjust the value the predetermined pressure difference.

6 Claims, 1 Drawing Sheet

PRESSURE REGULATOR

Figure 1:
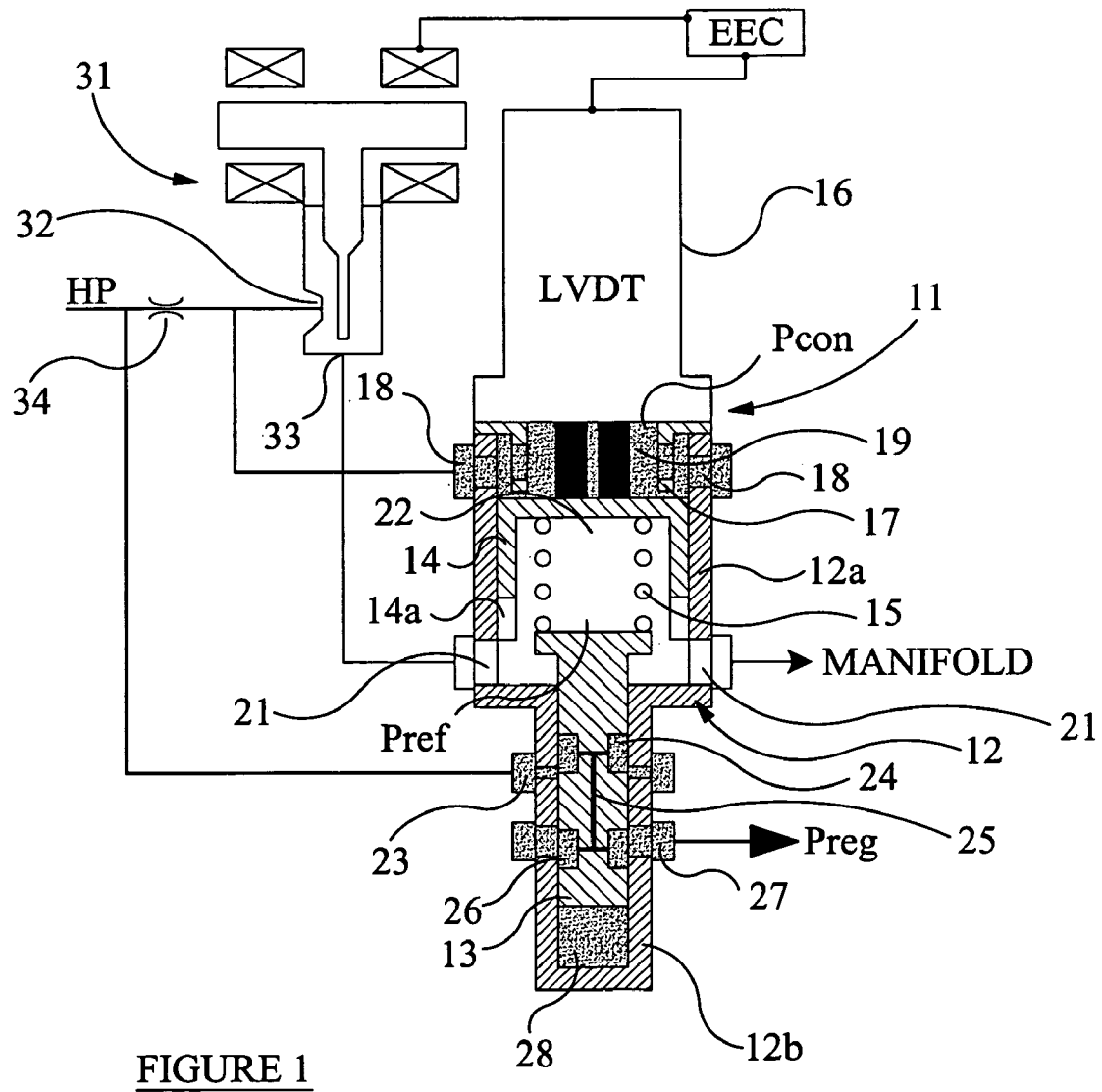

This invention relates to an hydraulic pressure regulator primarily, but not exclusively intended for use in the fuel system of an aircraft gas turbine engine.

It is well known to provide an hydraulic pressure regulator having a housing slidably receiving a metering spool. The position of the metering spool within the housing controls the degree of opening of a metering orifice which in turn controls the value of a regulated output pressure from the regulator ($P_{reg}$). $P_{reg}$ is derived from a high pressure (HP) hydraulic fluid supply to the regulator and within the housing $P_{reg}$ acts on one end of the metering spool to urge the metering spool to move in one direction. Within the housing a compression spring acts against the opposite end of the spool to oppose movement of the spool under the application of $P_{reg}$ to said one end of the spool. Furthermore, the end of the spool which is engaged by the spring is exposed in a pressure chamber of the valve which contains a reference pressure ($P_{ref}$). $P_{ref}$ is a lower pressure than $P_{reg}$ and the pressure regulator acts to maintain $P_{reg}$ at a predetermined amount $P_{diff}$ above $P_{ref}$. In the event that HP falls then $P_{reg}$ will start to fall and the balance between $P_{reg}$ acting on one end of the metering spool and the spring and $P_{ref}$ acting on the other end of the metering spool will result in movement of the metering spool to open the metering orifice of the regulator thereby increasing $P_{reg}$ to maintain $P_{diff}$ constant. Similarly if HP rises then $P_{reg}$ will tend to rise and the spool of the regulator will be moved in the opposite direction to reduce the metering orifice and so reduce $P_{reg}$ again to ensure that $P_{diff}$ is maintained. Such a pressure regulator is sometimes referred to as a fixed rate servo pressure regulator since the spring acting on the metering spool provides a fixed load for a given metering spool position.

It will be recognised that the fixed rate servo pressure regulator described above is designed to produce and maintain a particular value of $P_{diff}$. Should a different value of $P_{diff}$ be required then a different servo pressure regulator will be needed. In one particular gas turbine engine fuel control system there is a need to provide a plurality of different values of $P_{reg}$ in relation to $P_{ref}$ ($P_{diff}$), and it is an object of the present invention to provide a pressure regulator which can be controlled to produce such a range of different values of $P_{diff}$.

In accordance with the present invention there is provided a pressure regulator comprising a housing, a metering spool movable within the housing to control the degree of opening of a metering orifice of the regulator, a first inlet through which hydraulic fluid at high pressure is supplied to said metering orifice, a first pressure chamber within the housing and containing hydraulic fluid at a reference pressure ($P_{ref}$) to which one end of said metering spool is exposed, compression spring means within said first pressure chamber and acting at one end against said one end of said metering spool, an outlet from the housing downstream of said metering orifice, for hydraulic fluid at regulated pressure ($P_{reg}$) from said metering orifice, a second pressure chamber containing hydraulic fluid at said regulated pressure $P_{reg}$ to which the opposite end of said metering spool is exposed, such that the metering position of the metering spool relative to the housing is a position of equilibrium between the force of the spring and $P_{ref}$ acting on one end of said metering spool and $P_{reg}$ acting on the other end of the metering spool, said equilibrium position changing to maintain a predetermined pressure difference ($P_{diff}$) between $P_{ref}$ and $P_{reg}$, and the regulator further including an abutment against which the opposite end of said compression spring means reacts and a third pressure chamber containing hydraulic fluid at a control pressure ($P_{con}$) acting on said abutment, whereby the value of $P_{con}$ can be changed to adjust the position of said abutment relative to the housing of the regulator to change the pre-load of said compression spring means thereby to adjust the value of $P_{diff}$.

Preferably the regulator includes a sensor for monitoring the position of said abutment relative to said housing and for supplying a signal representative of that position to an electronic control arrangement.

Preferably said electronic control arrangement includes a closed loop control in which the position of the control valve controlling $P_{con}$ is adjusted in accordance with the actual position of the abutment sensed by the sensor and a required position of the abutment relative to the housing needed to achieve a predetermined value of $P_{diff}$.

The accompanying drawing is a diagrammatic representation of a pressure regulator in accordance with one example of the present invention.

Referring to the drawing, the pressure regulator 11 includes a hollow, generally cylindrical, metal housing 12 of circular cross-section having a large diameter region 12a and a smaller diameter region 12b. Received as a close sliding fit in the region 12b of the housing 12 is a cylindrical metal metering spool 13, and similarly received as a close sliding fit in the larger region 12a of the housing 12 is a hollow cylindrical abutment member 14. The abutment member 14 is of inverted cup-like form and a helically wound compression spring 15 acts between the inner face of the base of the abutment member 14 and one axial end of the spool 13 to urge the abutment member 14 and the spool 13 away from one another. The internal diameter of the abutment member 14 is sufficiently large in relation to the external diameter of the spool member 13 that during relative movement between the abutment member 14 and the spool 13 the spool can freely enter the abutment member 14.

The end of the housing 12 remote from the region 12b of the housing, is closed by an LVDT 16 (linear variable differential transformer) or some other convenient form of position sensor an input member of which is moved by the abutment member 14 so that the sensor can output a signal representative of the position of the abutment member 14 relative to the housing 12.

A stop member 17 in the form of a hollow metal sleeve is positioned within the housing region 12a between the LVDT 16 and the abutment member 14, the sleeve having an outwardly extending peripheral flange which is trapped between the end of the housing 12 and the LVDT 16 to secure the stop 17 in position. Engagement of the abutment member 14 with the axial end of the stop 17 limits movement of the abutment member 14 in one direction relative to the housing 12. Movement of the abutment member 14 in the opposite direction relative to the housing 12 is limited by engagement of the open end of the abutment member 14 with an internal radial step defined between the regions 12a and 12b of the housing.

The housing 12 has three inlet ports for hydraulic fluid under pressure to enter the housing, and one outlet port for hydraulic fluid under pressure to leave the housing. Each of the ports will be identified in more detail hereinafter, but it is to be understood that each port is defined by an annular gallery in the wall of the housing communicating with the respective region of the interior of the housing by way of a plurality of circumferentially spaced radial drillings through the wall of the housing. The ports are, respectively, a control pressure inlet port 18 at the end of the housing region 12a adjacent the LVDT 16. The region of the interior of the housing 12 between the abutment member 14 and the LVDT thus defines a control pressure chamber 19 through which the input member of the LVDT extends to contact the abutment member 14. The stop 17 has radial drillings to ensure that control pressure from the port 18 can act upon the surface area of the base of the abutment member 14 even when the abutment member 14 engages the stop 17.

Positioned in the wall of the housing region 12a adjacent the junction with the housing region 12b is a reference pressure inlet port 21 by way of which a reference pressure (to be described in more detail hereinafter) is admitted to reference pressure chamber 22 defined within the hollow abutment member 14. It will be noted that part of the wall of the abutment member 14 is cut away at 14a in alignment with one or more of the radial drillings of the port 21 in order to ensure that port 21 communicates with the reference pressure chamber 22 even when the abutment member 14 is in its limit position abutting the internal shoulder of the housing 12.

Intermediate the ends of the region 12b of the housing 12 there is provided a high pressure inlet port 23 the radial drillings of which can cooperate with a circumferential metering groove 24 in the wall of the metering spool 13. The axial positioning of the metering groove 24 along the length of the spool 13 is such in relation to the intended range of movement of the spool 13 relative to the housing region 12b that at one end of the travel of the spool 13 the groove 24 does not align with the inlet drillings 23 and thus the inlet 23 is closed internally of the housing 12 by a blank region of the wall of the spool 13. Movement of the spool from such a position progressively increases the degree of communication between the inlet drillings and the groove 24 as a metering edge of the groove 24 progressively traverses the area of the drillings.

The groove 24 is connected, by way of internal passages 25 in the spool 13, to a similar circumferential groove 26 formed in the wall of the spool 13 axially displaced from the groove 24 in a direction towards the closed end of the housing region 12b. The groove 26 communicates, throughout the whole range of movement of the spool 13 relative to the housing 12, with an outlet port 27 of the housing.

A further pressure chamber 28 is defined within the housing region 12b between the end of the spool 13 and the closed end of the region 12b. The pressure of the hydraulic fluid in the chamber 28 is equal to the pressure of the hydraulic fluid in the outlet port 27, during a steady state condition, by virtue of leakage from the port 27 and the groove 26 between the spool 13 and wall of the housing region 12b into the chamber 28. The interaction of the plain cylindrical end region of the spool and the corresponding interior of the housing region 12b defines a dashpot damping movements of the spool 13 relative to the housing 12.

It will be recognised that the spool 13 is urged to move relative to the housing 12 in one axial direction by the combined loading of the spring 15 and the pressure of the hydraulic fluid in the chamber 22 which acts on one end of the spool. However, simultaneously the spool is urged to move in the opposite direction by the pressure of the hydraulic fluid in the chamber 28 acting on the opposite end of the spool. Thus the spool will occupy an equilibrium position in which the forces acting at both ends of the spool are balanced.

Ignoring for the moment the possibility of movement of the abutment member 14, it will be recognised that the spool 13 achieves an equilibrium position in which the pressure of the hydraulic fluid in the chamber 28 and the outlet port 27 ($P_{reg}$) is maintained at a predetermined amount ($P_{diff}$) above the pressure of the hydraulic fluid in the chamber 22 ($P_{ref}$). The value of $P_{diff}$ is determined by the loading of the spring 15. It will be recognised that should $P_{ref}$ start to fall or $P_{reg}$ start to rise then the spool 13 will move against the action of the spring 15 towards the base of the abutment member 14, and in so doing will reduce the degree of opening of the port 23 thus metering the high pressure supplied to the port 23 to produce a lower value of $P_{reg}$ consistent with maintaining a constant value of $P_{diff}$. Similarly should $P_{reg}$ start to fall or $P_{ref}$ start to rise then the spool 13 will be moved in the opposite direction increasing the opening of inlet port 23 and allowing an increase in the $P_{reg}$ again to maintain $P_{diff}$ constant.

An objective of the invention is to provide a regulator in which a plurality of different predetermined values of $P_{diff}$ can be achieved with the same regulator components. This objective is realised in the regulator described above by moving the abutment member 14 to vary the pre-load of the spring 15, and thus vary the setting of $P_{diff}$. For example, assume that the abutment member 14 is engaged with the stop 17; the pre-load of the spring 15 (with the abutment member 14 against its stop 17) is a first pre-load value which gives a first value of $P_{diff}$ which we can identify as $P_{diff1}$. Supplying hydraulic fluid at increased pressure to the chamber 19 lifts the abutment member 14 away from the stop 17 against the action of the spring 15 thereby increasing the pre-loading of the spring 15 in relation to its interaction with the spool 13. Let us assume that the pressure $P_{con}$ in the chamber 19 is raised from a rest value $P_{con1}$ to a second value $P_{con2}$, then in the absence of any change in $P_{ref}$ in the chamber 22 the abutment member 14 will assume a new position within the housing region 12a in which the pre-load of the spring 15 is increased thereby increasing the value of $P_{diff}$ to the new value $P_{diff2}$, and the spool 13 will be moved to cause an increase in $P_{reg}$ to $P_{reg2}$ (the difference between $P_{ref}$ and $P_{reg2}$ being $P_{diff2}$).

It will be recognised therefore that by adjusting the value of $P_{con}$ in the chamber 19, the pressure regulator can be caused to operate at a plurality of different, and predetermined values of $P_{diff}$ to give a corresponding predetermined series of values of $P_{reg}$.

The accompanying drawing also shows a convenient way of controlling the regulator described above. An electric torque motor driven flapper valve 31 has an hydraulic fluid inlet port 32 and an outlet port 33. The outlet port 33 is connected to the inlet port 21 of the regulator, and the inlet port 21 is also connected, where the valve is used in conjunction with a gas turbine engine, to the burner manifold of the engine, and thus supplies hydraulic fluid (which in the case of a gas turbine engine fuel control system will be engine fuel), thereto. Hydraulic fluid is supplied from a high pressure source HP to the inlet port 23 of the regulator, and is also supplied through a fixed, flow restrictor orifice 34 to the flapper valve inlet port 32 and the control pressure port 18 of the regulator. The setting of the flapper valve 31 is controlled by the electronic engine controller (EEC) of the engine fuel control system which in turn receives a signal from the LVDT 16 representative of the position of the abutment member 14 relative to the housing 12. The setting of the flapper valve 31 controls the pressure at the inlet 32, and thus the pressure $P_{con}$ supplied to the chamber 19 of the regulator. The EEC will receive, or derive, a control signal which identifies the value of $P_{reg}$ which is required, from a selection of predetermined $P_{reg}$ values. In consequence, the EEC will control the setting of the flapper valve 31 to increase or decrease the value of $P_{con}$ in the chamber 19 to set the position of the abutment member 14 to achieve the necessary value of $P_{diff}$ required to obtain the desired value of $P_{reg}$ above $P_{ref}$. Should a different value of $P_{reg}$ be required then the EEC will supply the appropriate signal to the valve 31 to cause the appropriate movement of the abutment member 14 to achieve a new spring rating or pre-load for the spring 15 to achieve the new value of $P_{reg}$.

In one particular example the regulator described above is used as part of an aircraft gas turbine engine fuel control system in which the burner head of the gas turbine engine has four distinct operating modes to effect staged combustion. The change between the various modes of staged combustion of the engine is effected by changing the value of $P_{reg}$ between four predetermined values. Thus the EEC is programmed in relation to the four required $P_{reg}$ values, with information related to the position which the abutment member 14 must occupy to achieve each of the four values of $P_{reg}$ for a given fixed value of $P_{ref}$. In effect the EEC forms part of a closed loop control arrangement in which the signal representative of the position of the abutment member, supplied from the LVDT 16 to the EEC is used to control the setting of the valve 31.

If desired a temperature transducer could be incorporated into the engine manifold to feed to the EEC a temperature dependant signal for adjusting the preset positions of the abutment member 14 in accordance with temperature variations.

I claim:

1. A pressure regulator comprising a housing, a metering spool movable within the housing to control the degree of opening of a metering orifice of the regulator, a first inlet through which hydraulic fluid at high pressure is supplied to said metering orifice, a first pressure chamber within the housing and containing hydraulic fluid at a reference pressure ($P_{ref}$) to which one end of said metering spool is exposed, compression spring means within said first pressure chamber and acting at one end against said one end of said metering spool, an outlet from the housing downstream of said metering orifice, for hydraulic fluid at regulated pressure ($P_{reg}$) from said metering orifice, a second pressure chamber containing hydraulic fluid at said regulated pressure $P_{reg}$ to which the opposite end of said metering spool is exposed, such that the metering position of the metering spool relative to the housing is a position of equilibrium between the force of the spring and $P_{ref}$ acting on one end of said metering spool and $P_{reg}$ acting on the other end of the metering spool, said equilibrium position changing to maintain a predetermined pressure difference ($P_{diff}$) between $P_{ref}$ and $P_{reg}$, and the regulator further including an abutment against which the opposite end of said compression spring means reacts and a third pressure chamber containing hydraulic fluid at a control pressure ($P_{con}$) acting on said abutment, whereby the value of $P_{con}$ can be changed to adjust the position of said abutment relative to the housing of the regulator to change the pre-load of said compression spring means thereby to adjust the value of $P_{diff}$.

2. A pressure regulator according to claim 1, further comprising a sensor for monitoring the position of said abutment relative to said housing and for supplying a signal representative of that position to an electronic control arrangement.

3. A pressure regulator according to claim 2, wherein the electronic control arrangement includes a closed loop control in which $P_{con}$ is adjusted in accordance with the actual position of the abutment sensed by the sensor and a required position of the abutment relative to the housing needed to achieve a predetermined value of $P_{diff}$.

4. A pressure regulator according to claim 3, wherein $P_{con}$ is adjusted by controlling the operation of a control valve.

5. A pressure regulator according to claim 4, wherein the control valve comprises a flapper valve.

6. A pressure regulator according to claim 4, wherein the third pressure chamber is supplied with fluid under pressure through a flow restrictor orifice, and the control valve controls communication between the third pressure chamber and a low pressure reservoir.

* * * * *